United States Patent
Chen

(10) Patent No.: US 12,203,857 B2
(45) Date of Patent: Jan. 21, 2025

(54) MULTI-ELEMENT SUPER RESOLUTION OPTICAL INSPECTION SYSTEM

(71) Applicant: KLA Corporation, Milpitas, CA (US)

(72) Inventor: Grace Hsiu-Ling Chen, Los Gatos, CA (US)

(73) Assignee: KLA Corporation, Milpitas, CA (US)

( * ) Notice: Subject to any disclaimer, the term of this patent is extended or adjusted under 35 U.S.C. 154(b) by 43 days.

(21) Appl. No.: 18/119,189

(22) Filed: Mar. 8, 2023

(65) Prior Publication Data

US 2023/0296517 A1    Sep. 21, 2023

Related U.S. Application Data

(60) Provisional application No. 63/319,821, filed on Mar. 15, 2022.

(51) Int. Cl.
  *G01N 21/64* (2006.01)
  *G01N 21/88* (2006.01)

(52) U.S. Cl.
  CPC ..... *G01N 21/6456* (2013.01); *G01N 21/6428* (2013.01); *G01N 21/88* (2013.01);
  (Continued)

(58) Field of Classification Search
  None
  See application file for complete search history.

(56) References Cited

U.S. PATENT DOCUMENTS 5,789,750 A * 8/1998 Nuss ............... H01Q 3/2676
                                                    250/341.1
7,180,658 B2   2/2007 Shafer et al.
(Continued)

FOREIGN PATENT DOCUMENTS

| JP | 2005526253 A | 9/2005 |
|---|---|---|
| JP | 2012033929 A | 2/2012 |
| KR | 101296168 B1 | 8/2013 |

OTHER PUBLICATIONS

Korean Intellectual Property Office, International Search Report and Written Opinion for International Application No. PCT/US2023/015236, Jul. 11, 2023, 12 pages.

(Continued)

*Primary Examiner* — David P Porta
*Assistant Examiner* — Djura Malevic
(74) *Attorney, Agent, or Firm* — Suiter Swantz IP

(57) ABSTRACT

A method is disclosed. The method may include generating a first optical image of a sample with a first inspection sub-system. The first optical image may be generated when a first set of photoluminescent markers are emitting photoluminescent illumination at a first time interval. The method may include generating additional optical images with an additional inspection sub-system. The additional optical images may be generated when additional photoluminescent markers are emitting photoluminescent illumination at additional time intervals. The method may include generating an accumulated optical image based on the first optical image and the additional optical images. The method may include determining a location of the photoluminescent markers based on the accumulated optical image. The method may include determining a pattern of the sample based on the determined location of the photoluminescent markers.

21 Claims, 9 Drawing Sheets

(52) U.S. Cl.
CPC ........... *G01N 2021/6439* (2013.01); *G01N 2201/0634* (2013.01); *G01N 2201/0636* (2013.01)

(56) References Cited

U.S. PATENT DOCUMENTS

| | | | |
|---|---|---|---|
| 7,639,419 | B2 | 12/2009 | Chuang et al. |
| 7,646,533 | B2 | 1/2010 | Chuang et al. |
| 7,869,121 | B2 | 1/2011 | Shafer et al. |
| 9,104,120 | B2 * | 8/2015 | Seligson ............ G03F 7/70633 |
| 11,086,137 | B2 * | 8/2021 | Wang ................. G02B 21/367 |
| 11,676,794 | B2 * | 6/2023 | Wang ................... G02B 1/041 |
| | | | 250/459.1 |
| 2003/0231400 | A1 * | 12/2003 | Frosig ................ G02B 3/0056 |
| | | | 359/619 |
| 2005/0220266 | A1 * | 10/2005 | Hirsch .................... G21K 7/00 |
| | | | 378/43 |
| 2012/0025100 | A1 | 2/2012 | Allenic et al. |
| 2015/0185474 | A1 * | 7/2015 | Goldberg ........... G02B 27/0068 |
| | | | 359/849 |
| 2015/0248002 | A1 * | 9/2015 | Ingersoll ................ G02B 21/26 |
| | | | 359/395 |
| 2016/0320628 | A1 * | 11/2016 | Leonberger ......... G02B 3/0056 |
| 2016/0327779 | A1 * | 11/2016 | Hillman ............. G02B 21/0032 |
| 2020/0012121 | A1 * | 1/2020 | Wang ................. G01N 21/6458 |
| 2021/0366688 | A1 * | 11/2021 | Wang ..................... H01J 37/261 |
| 2023/0062418 | A1 | 3/2023 | Chen et al. |
| 2024/0158852 | A1 * | 5/2024 | Belhocine ............ C12Q 1/6876 |
| 2024/0182956 | A1 * | 6/2024 | Glezer ................ C12Q 1/6804 |

OTHER PUBLICATIONS

U.S. Appl. No. 18/101,573, filed Jan. 25, 2023, Kim et al.

Choi et al "Overcoming metal-induced fluorescence quenching on plasmo-photonic metasurfaces coated by a self-assembled monolayer" Chem. Commun. 2015, 51, 11470.

H. A. Lee et al."Polydopamine and its derivative surface chemistry in material science: a focused review for studies at KAIST" Adv. Mater. 2020, 32, 1907505.

H. K. Park et al."Material-selective Polydopamine Coating in Dimethyl Sulfoxide" ACS AMI 2020, 12, 49146.

J. C. Love et al "Self-assembled monolayers of thiolates on metals as a form of nanotechnology" Chem. Rev. 2005, 105, 1103.

S. Hong et al "Poly(norepinephrine): ultrasmooth material-independent surface chemistry and nanodepot for nitric oxide" Angew. Chem. 2013, 52, 9187.

X.-L. Zhang et al "Fluorescence decay of quasimonolayered porphyrins near a metal surface separated by short-chain alkanethiols" Appl. Phys. Lett. 2008, 92, 223118.

Y. Liu et al "Polydopamine and its derivative materials: synthesis and promising applications in energy, environmental, and biomedical fields" Chem. Rev. 2014, 114, 5057.

Z. Mekhalif et al "Comparative assessment of n-dodecanethiol and n-dodecaneselenol monolayers on electroplated copper" J. Electroanalytical Chem. 2008, 621, 245.

B.-G. Kim et al., "Energy level modulation of HOMO, LUMO, and band-gap in conjugated polymers for organic photovoltaic applications" Adv. Funct. Mater. 2013, 23, 439.

B.-G. Kim et al., "Organic dye design tools for efficient photocurrent generation in dye sensitized solar cells; exciton binding energy and electron acceptor" Adv. Funct. Mater. 2012, 22, 1606.

J. Kim et al., "Control of conformational and interpolymer effects in conjugated polymers" Nature 2001, 411, 1030.

K. Lee et al., "Conjugated Polyelectrolyte-antibody hybrid materials for highly fluorescent live cell-imaging" Adv. Mater. 2012, 24, 2479.

K. Lee et al., "Conjugated polymers combined with molecular beacon for label-free and self-signal amplifying DNA microarrays" Adv. Funct. Mater. 2009, 19, 3317.

K. Lee et al., "Design principle of conjugated polyelectrolytes to make them water-soluble and highly emissive" Adv. Funct. Mater. 2012, 22, 1076.

K. Lee et al., "Signal-amplifying conjugated polymer-DNA hybrid chips" Angew. Chem 2007, 46, 4667.

X. Zhao, "Meta-linked poly (phenylene ethynylene) conjugated polyelectrolyte featuring a chiral side group: helical folding and guest binding" Langmuir 2006, 22, 4856.

* cited by examiner

MULTI-ELEMENT SUPER RESOLUTION OPTICAL INSPECTION SYSTEM

CROSS-REFERENCE TO RELATED APPLICATIONS

The present application claims the benefit under 35 U.S.C. § 119(e) of U.S. Provisional Patent Application Ser. No. 63/319,821, filed Mar. 15, 2022, which is incorporated herein by reference in the entirety.

TECHNICAL FIELD

The present invention generally relates to defect detection, and, more particularly, to a multi-element super resolution optical inspection system.

BACKGROUND

As the demand for integrated circuits having ever-small device features continues to increase, the need for improving defect detection mechanisms continues to grow. Electron beam inspection systems yield high resolution images, however, they are unable to scan the full sample with acceptable throughput rates and at a reasonable time. As such, current inspection systems often rely on principles of light scattering for defect signal generation. However, as the defect size continues to shrink, the optical mode optimization becomes insufficient. Finding the optimal optical mode is important to maximize the unique scattering signature of the defect.

As such, it would be advantageous to provide system and method to remedy the shortcomings of the approaches identified above.

SUMMARY

A multi-element super resolution inspection is disclosed, in accordance with one or more embodiments of the present disclosure. In embodiments, the system includes an array of inspection sub-systems. In embodiments, each inspection sub-system includes one or more illumination sources configured to illuminate a sample positioned on a stage with one or more illumination beams, the sample including at least a first material and at least a second material, wherein the first material is different from the second material, the sample including a plurality of photoluminescent markers configured to selectively bind to one of the first material or the second material to enhance a feature of interest on the sample. In embodiments, each inspection sub-system includes a set of optical elements, at least one optical element of the set of optical elements configured to independently and selectively direct the one or more illumination beams from the one or more illumination sources to the plurality photoluminescent markers of the sample to cause at least one photoluminescent marker of the plurality of photoluminescent markers to emit photoluminescent illumination. In embodiments, each inspection sub-system includes one or more detectors configured to detect the photoluminescent illumination emitted by the at least one photoluminescent marker of the plurality of photoluminescent markers selectively bound to one of the first material or the second material of the sample, the set of optical elements configured to selectively direct the photoluminescent illumination from the at least one photoluminescent marker of the plurality of photoluminescent markers of one of the first material or the second material of the sample to the one or more detectors. In embodiments, a first inspection sub-system of the array of inspection sub-systems is configured to generate a first illumination beam at a first time interval and direct the first illumination beam to a first portion of the sample including a first set of photoluminescent markers to cause the first set of photoluminescent markers to emit photoluminescent illumination at the first time interval, the first inspection sub-system of the array of inspection sub-systems configured to image the first portion of the sample at the first time interval when the first set of photoluminescent markers are emitting photoluminescent illumination to generate a first optical image. In embodiments, one or more additional inspection sub-systems of the array of inspection sub-systems are configured to generate an additional set of illumination beams at one or more additional time intervals and direct the additional sets of illumination beams to one or more additional portions of the sample including one or more additional sets of photoluminescent markers to cause the one or more additional sets of photoluminescent markers to emit photoluminescent illumination at the one or more additional time intervals, the one or more additional inspection sub-systems of the array of inspection sub-systems configured to image the one or more additional portions of the sample at the one or more additional time intervals when the one or more additional sets of photoluminescent markers are emitting photoluminescent illumination to generate one or more additional optical images. In embodiments, the system further includes a controller communicatively coupled to the array of inspection sub-system. In embodiment, the controller includes one or more processors configured to execute program instructions to cause the one or more processors to: generate a first optical image of a sample with a first inspection sub-system of the array of inspection sub-systems, the first optical image generated when a first set of photoluminescent markers of the plurality of photoluminescent markers are emitting photoluminescent illumination at a first time interval; generate one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals; generate an accumulated optical image based on the received first optical image and the one or more additional received optical images; determine a location of the plurality of photoluminescent markers based on the accumulated optical image; and determine a pattern of the sample based on the determined location of the plurality of photoluminescent markers.

A method for super resolution inspection is disclosed, in accordance with one or more embodiments of the present disclosure. In embodiments, the method includes generating a first optical image of a sample with a first inspection sub-system of an array of inspection sub-systems, the sample including at least a first material and at least a second material, wherein the first material is different from the second material, wherein the sample including a plurality of photoluminescent markers configured to selectively bind to one of the first material or the second material to enhance a feature of interest on the sample, the first optical image generated when a first set of photoluminescent markers of the plurality of photoluminescent markers are emitting photoluminescent illumination at a first time interval. In embodiments, the method includes generating one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals. In embodiments, the method includes generating an accumulated optical image based on the received first optical image and the one or more additional received optical images. In embodiments, the method includes determining a location of the plurality of photoluminescent markers based on the accumulated optical image. In embodiments, the method includes determining a pattern of the sample based on the determined location of the plurality of photoluminescent markers.

A system is disclosed, in accordance with one or more embodiments of the present disclosure. In embodiments, the system includes a controller including one or more processors configured to execute program instructions to cause the one or more processors to: generate a first optical image of a sample with a first inspection sub-system of an array of inspection sub-systems, the sample including at least a first material and at least a second material, wherein the first material is different from the second material, the sample including a plurality of photoluminescent markers configured to selectively bind to one of the first material or the second material to enhance a feature of interest on the sample, the first optical image generated when a first set of photoluminescent markers of the plurality of photoluminescent markers are emitting photoluminescent illumination at a first time interval; generate one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals; generate an accumulated optical image based on the received first optical image and the one or more additional received optical images; determine a location of the plurality of photoluminescent markers based on the accumulated optical image; and determine a pattern of the sample based on the determined location of the plurality of photoluminescent markers.

A multi-element super resolution inspection is disclosed, in accordance with one or more embodiments of the present disclosure. In embodiments, the system includes an array of inspection sub-systems. In embodiments, each inspection sub-system includes one or more illumination sources configured to illuminate a sample positioned on a stage with one or more illumination beams, the sample including at least a first material and at least a second material, wherein the first material is different from the second material, the sample including a plurality of photoluminescent markers configured to selectively bind to one of the first material or the second material to enhance a feature of interest on the sample. In embodiments, each inspection sub-system includes a set of optical elements, at least one optical element of the set of optical elements configured to independently and selectively direct the one or more illumination beams from the one or more illumination sources to the plurality photoluminescent markers of the sample to cause at least one photoluminescent marker of the plurality of photoluminescent markers to emit photoluminescent illumination. In embodiments, each inspection sub-system includes one or more detectors configured to detect the photoluminescent illumination emitted by the at least one photoluminescent marker of the plurality of photoluminescent markers selectively bound to one of the first material or the second material of the sample, the set of optical elements configured to selectively direct the photoluminescent illumination from the at least one photoluminescent marker of the plurality of photoluminescent markers of one of the first material or the second material of the sample to the one or more detectors. In embodiments, a first inspection sub-system of the array of inspection sub-systems is configured to generate a first illumination beam at a first time interval and direct the first illumination beam to a first portion of the sample including a first set of photoluminescent markers to cause the first set of photoluminescent markers to emit photoluminescent illumination at the first time interval, the first inspection sub-system of the array of inspection sub-systems configured to image the first portion of the sample at the first time interval when the first set of photoluminescent markers are emitting photoluminescent illumination to generate a first optical image. In embodiments, one or more additional inspection sub-systems of the array of inspection sub-systems are configured to generate an additional set of illumination beams at one or more additional time intervals and direct the additional sets of illumination beams to one or more additional portions of the sample including one or more additional sets of photoluminescent markers to cause the one or more additional sets of photoluminescent markers to emit photoluminescent illumination at the one or more additional time intervals, the one or more additional inspection sub-systems of the array of inspection sub-systems configured to image the one or more additional portions of the sample at the one or more additional time intervals when the one or more additional sets of photoluminescent markers are emitting photoluminescent illumination to generate one or more additional optical images.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Figure 1A:
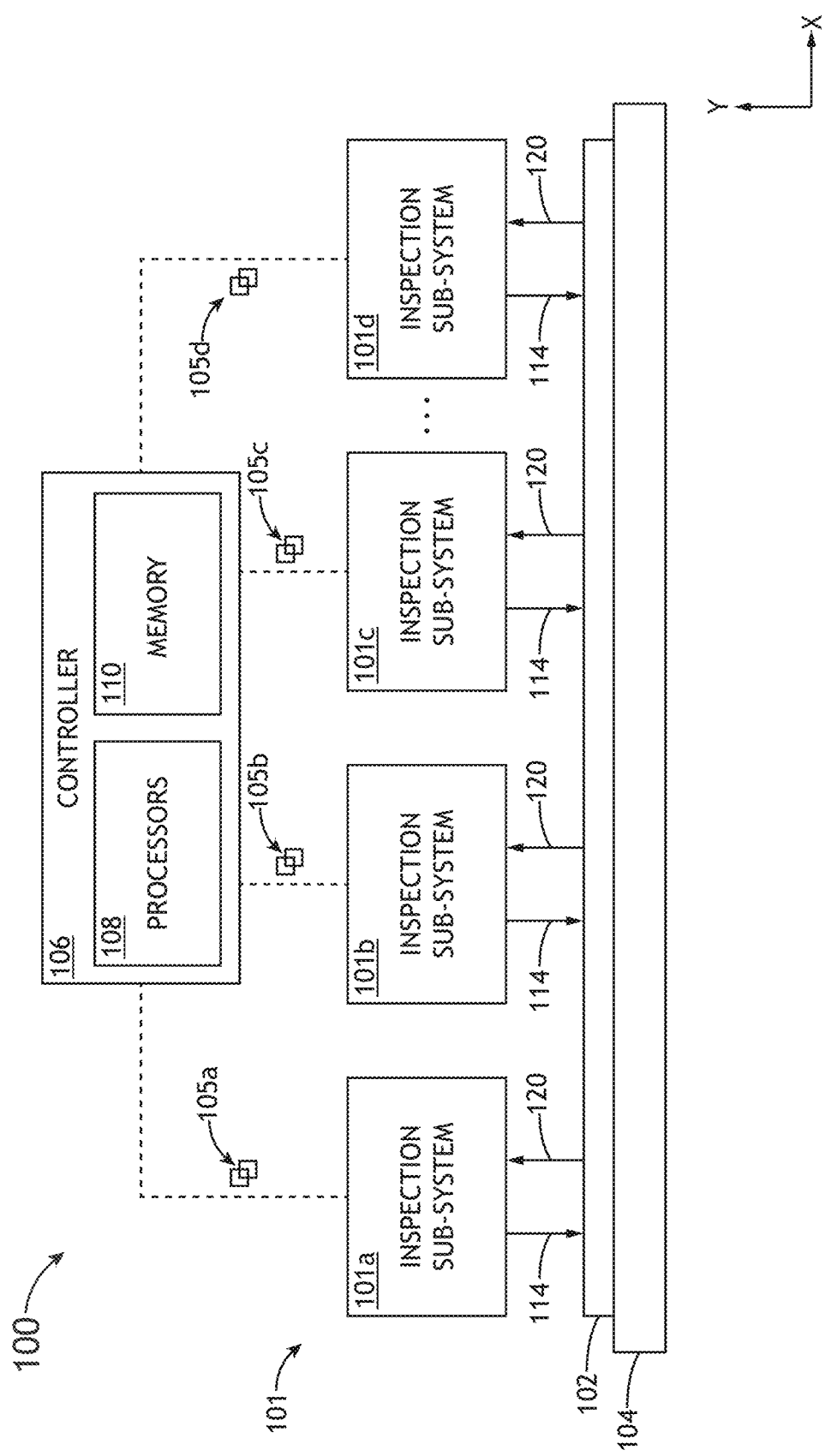
FIG. 1A illustrates a simplified schematic of a multi-element super resolution optical inspection system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to a system and method for multi-element super resolution optical inspection. In particular, embodiments of the present disclosure are directed to a system and method for multi-element super resolution optical inspection using selective markers on a sample, where the selective markers have blinking characteristics (e.g., switches between on/off states). For example, the selective markers may include a photoluminescent marker configured to selectively attach to at least one of a first material or a second material of a sample, where one or more illumination sources may be configured to selectively excite the photoluminescent marker to cause a selected photoluminescent marker to emit photoluminescent emission. As such, optical mode optimization may be reduced because the signal characteristics of the photoluminescent markers are known prior to inspection.

Further, embodiments of the present disclosure are directed to a system and method for multi-element super resolution optical inspection using an array of inspection sub-systems, where a respective inspection sub-system may be individually controllable. For example, the array of inspection sub-systems may be configured to image a sample including the selective markers at a different time intervals to generate a plurality of optical images at the respective time intervals. For instance, a respective inspection sub-system may be configured to individually image a respective portion of the sample to generate a respective optical image of the respective portion of the sample. In this regard, an accumulated optical image may be generated based on respective optical images from the respective inspection sub-systems, such that a location of the selective markers may be determined based on the accumulated optical image. As such, the location of the selective markers may be used to determine a pattern of the sample using the accumulated optical image. This enables high sensitivity defect detection since the locations of the photoluminescent markers yield pattern information at nanometer scale which allows the system to resolve the sample feature. Further, the photoluminescent marker may bind to the defect to reveal the locations of defect. Unlike traditional optical inspections which, rely on signal-to-noise ratio (SNR) differentiation for defect detection, the super resolution system finds the presence of the defect by detecting the position of the photoluminescent markers in relation to the defects. Further, since the system enables parallel image acquisition during sample scanning, sample throughput is significantly higher than electron beam inspection (EBI) systems.

Figure 1B:
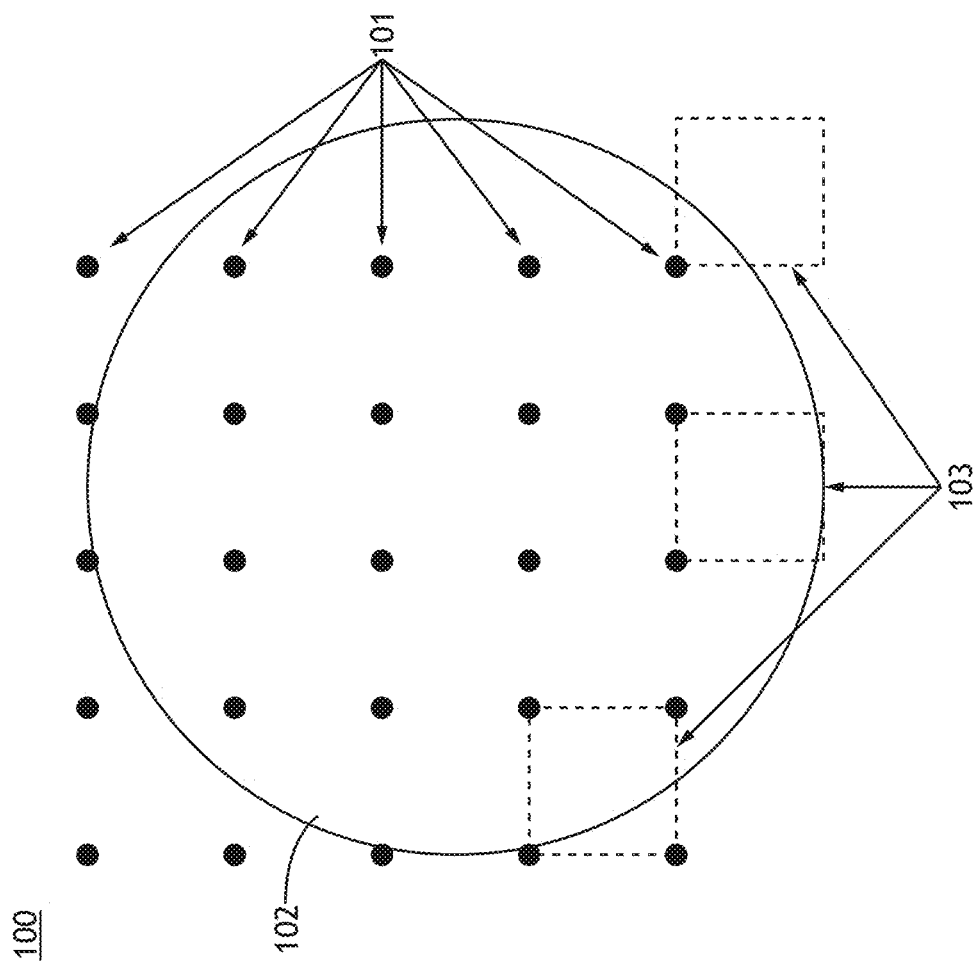
FIG. 1B illustrates a top conceptual view of the multi-element super resolution optical inspection system, in accordance with one or more embodiments of the present disclosure.

FIG. 1A is a simplified schematic diagram illustrating a multi-element super resolution optical inspection system 100, in accordance with one or more embodiments of the present disclosure. FIG. 1B is a conceptual diagram illustrative a top view of an array of inspection sub-systems 101a-101d of the multi-element super resolution optical inspection system 100 positioned above respective portions of a sample 102, in accordance with one or more embodiments of the present disclosure.

In embodiments, the system 100 includes an array of inspection sub-systems 101a-101d positioned above a sample 102. For example, as shown in FIG. 1A, the system 100 may include a first inspection sub-system 101a, a second inspection sub-system 101b, a third inspection sub-system 101c, up to an N number of inspection sub-systems 101d.

In embodiments, the system 100 includes a stage assembly 104 suitable for securing and positioning the sample 102. The stage assembly 104 may include any sample stage architecture known in the art. For example, the stage assembly 104 may include a linear stage configured to translate the sample 102 along one of the x- or y-axis. By way of another example, the stage assembly 104 may include a rotational stage.

Referring to FIG. 1B, each inspection sub-system 101a-101d of the array of inspection sub-systems 101a-101d may be positioned above a respective portion of the sample 102. For example, a respective inspection sub-system 101a-101d may be configured to scan (or image) a respective portion of the sample 102 based on a respective scan field 103 of the respective inspection sub-system 101a-101d. For instance, the stage assembly 104 may be configured to adjust a position of the sample 102 based on the respective scan field 103 of the respective inspection sub-system 101a-101d to generate a plurality of images 105a-105d.

In one instance, a first inspection sub-system 101a may include a first scan field, such that the first inspection sub-system 101a may be configured to image a first portion of the sample 102 to generate a first image 105a of the sample 102. In another instance, a second inspection sub-system 101b may include a second scan field, such that the second inspection sub-system 101b may be configured to image a second portion of the sample 102 to generate a second image 105b of the sample. In another instance, a third inspection sub-system 101c may include a third scan field, such that the third inspection sub-system 101c may be configured to image a third portion of the sample 102 to generate a third image 105c of the sample. It is noted that the system 100 may include up to an N number of inspection sub-systems 101d configured to image up an N number of portions of the sample to generate up to an N number of images 105d of the sample. It is noted that the system 100 may include any configuration of inspection sub-systems 101 (e.g., any number, any arrangement, and the like). FIGS. 1A-1B are provided merely for illustrative purposes and shall not be construed as limiting the scope of the present disclosure.

In embodiments, the system 100 includes a controller 106 communicatively coupled the array of inspection sub-systems 101a-101d. The controller 106 may include one or more processors 108 configured to execute a set of program instructions maintained in a memory medium 110 (memory 110).

In embodiments, the one or more processors 108 are configured to execute program instructions configured to determine a location of a plurality of photoluminescent markers based on a generated accumulated position map of the sample, such that the pattern on the sample and defect may be resolved, as will be discussed further herein.

In embodiments, the one or more processors 108 are configured to execute program instructions configured to direct the one or more processors 108 to identify one of more defects 204 on the sample 102 based on the collected photoluminescent emission 120. For example, the one or more processors 108 may be configured to generate an accumulated position map based on the generated plurality of optical images from the respective inspection sub-systems 101a-101d. For instance, the one or more processors 108 may be configured to receive a plurality of optical inspection images 105a-105d from the respective inspection sub-systems 101a-101d and generate the accumulated position map. In this regard, the one or more processors 108 may be configured to determine a location of the photoluminescent markers based on the generated accumulated map, such that the pattern on the sample and defect may be resolved.

Figure 1C:
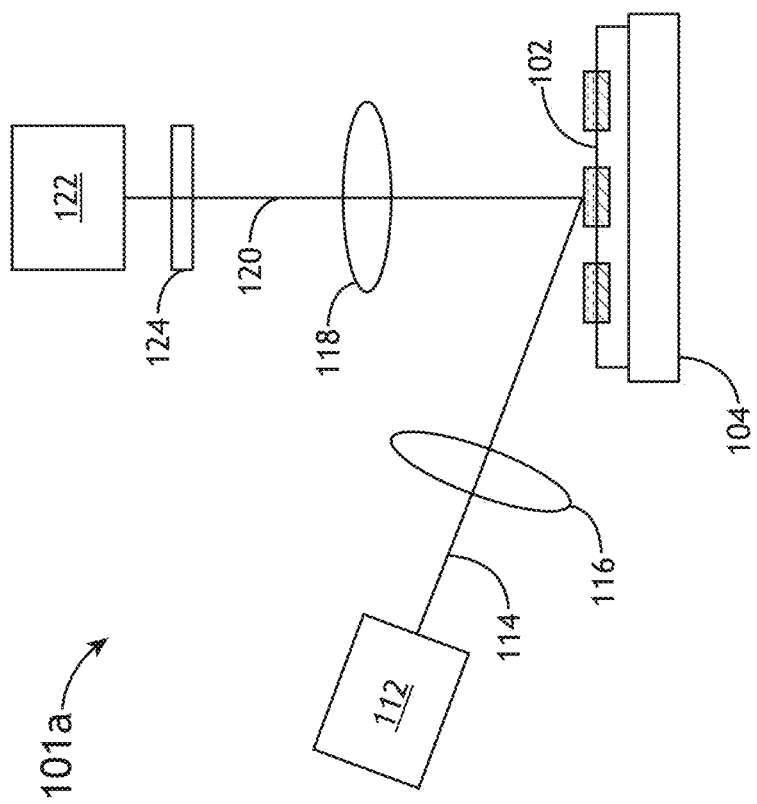
FIG. 1C illustrates a simplified schematic of an inspection sub-system of the multi-element super resolution optical inspection system, in accordance with one or more embodiments of the present disclosure.

FIG. 1C is a simplified schematic diagram illustrating an inspection sub-system 101a of the multi-element super resolution optical inspection system 100, in accordance with one or more embodiments of the present disclosure. For purposes of the present disclosure "inspection sub-system 101", "sub-system 101", and variations thereof may be considered equivalent, unless otherwise noted herein.

In embodiments, one or more of the inspection sub-systems 101a-101d may be embodied by the inspection sub-system 101 depicted in FIG. 1C. In embodiments, one or more of the inspection sub-systems 101a-101d may include one or more illumination sources 112 configured to generate one or more illuminations beams 114. The one or more illumination sources 112 may include any type of illumination source suitable for exciting a photoluminescent marker on a surface of a sample.

In embodiments, the one or more illumination sources 112 include one or more narrowband illumination sources. For example, the one or more illumination sources 112 may include, but is not limited to, one or more fiber light sources. For instance, the one or more fiber light sources may include, but are not limited to, one or more light emitting diodes (LEDs), one or more laser diodes, and the like. The laser diodes may be configured to produce any type of laser radiation such as, but not limited to, infrared radiation, visible radiation, and/or ultraviolet (UV) radiation.

In embodiments, the one or more illumination sources 112 include one or more broadband illumination sources. For example, the one or more illumination sources 112 may include, but are not limited to, one or more broadband lamps configured to generate broadband light of a range of wavelengths (e.g., white light). For instance, the one or more illumination sources 112 may include, but are not limited to, one or more broadband plasma (BBP) lights.

Figure 2A:
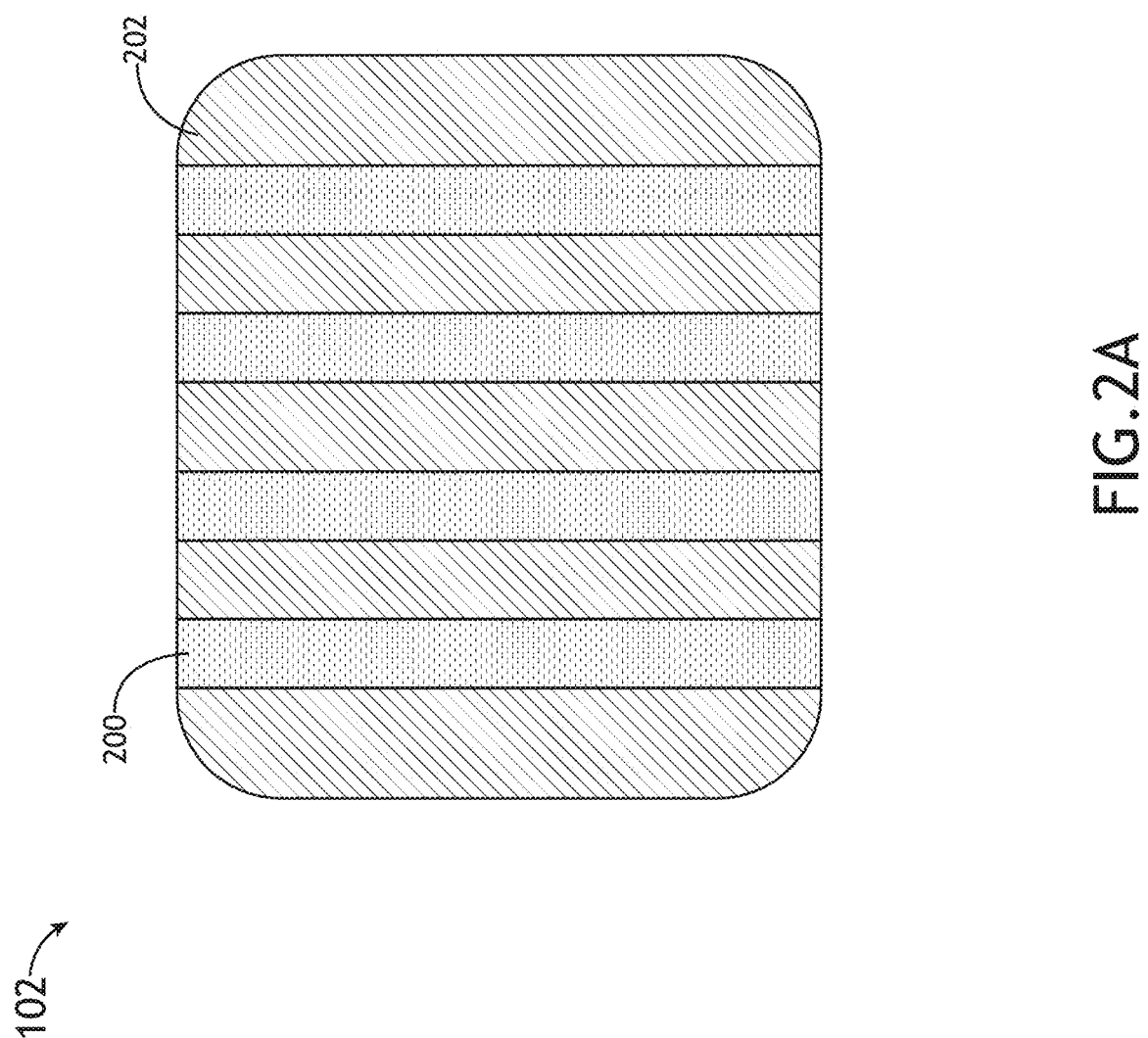
FIG. 2A illustrates a schematic view of a patterned sample, in accordance with one or more embodiments of the present disclosure.
Figure 2B:
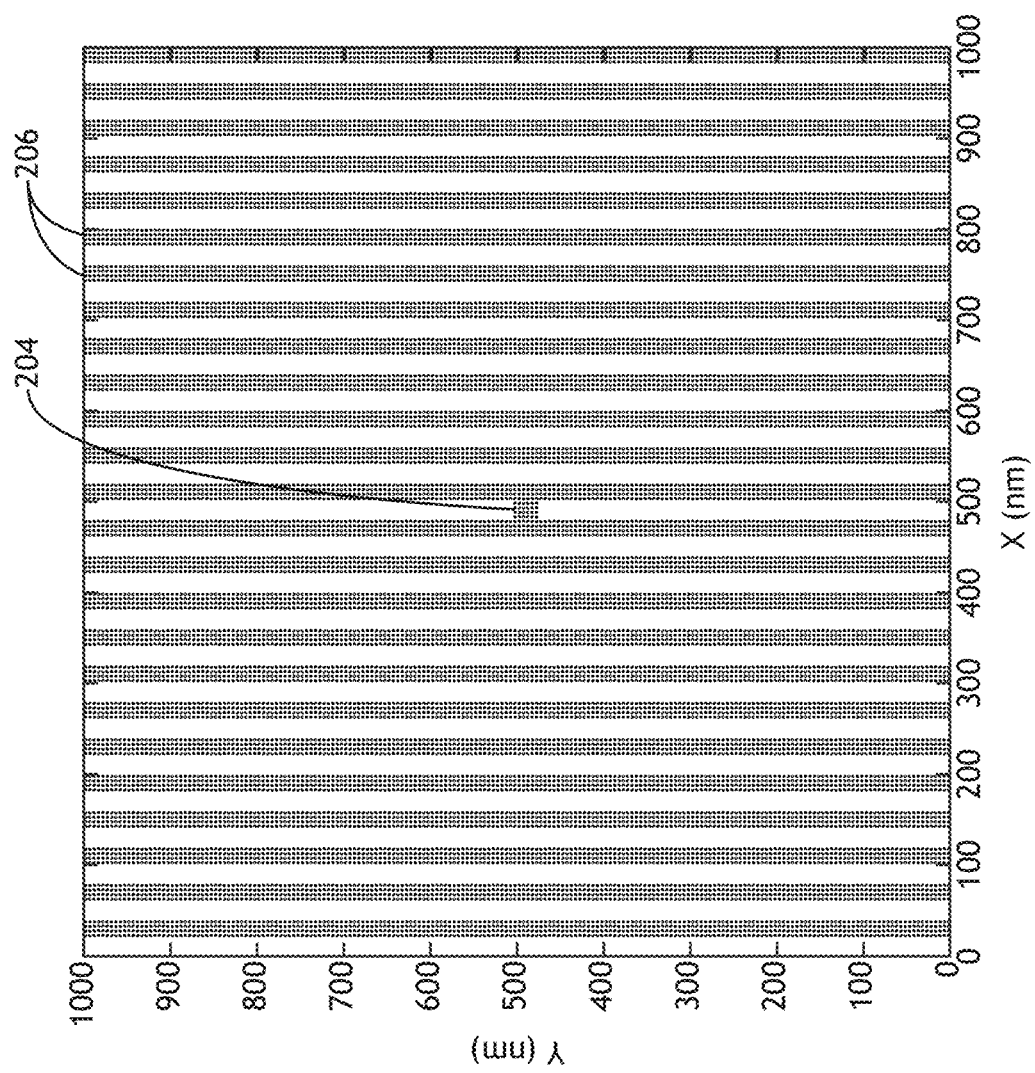
FIG. 2B illustrates a schematic view of a patterned sample including a plurality of photoluminescent markers, in accordance with one or more embodiments of the present disclosure.

FIGS. 2A-2B are conceptual diagrams illustrating patterned samples 102, in accordance with one or more embodiments of the present disclosure. It is noted herein that the patterned samples 102 illustrated in FIGS. 2A-2B are shown at a high magnification for illustrative purposes.

In embodiments, the sample 102 may include a patterned sample 102. For example, the sample 102 may include a patterned substrate 102. In one instance, the sample 102 may include a patterned wafer 104. Further, the sample 102 may include an integrated circuit (IC) device 102. In another instance, the sample 102 may include a patterned meta lens.

The pattern of the sample 102 may be formed of at least a first material 200 and a second material 202, where the first material 200 is different from the second material 202. For example, as shown in FIGS. 2A-2B, the sample 102 may include a grating pattern formed from the interlacing of the first material 200 and the second material 202.

Although FIGS. 2A-2B depict the patterned sample 102 being formed of a first material 200 and a second material 202, it is noted that the patterned sample 102 may be formed of any number of materials. For example, the patterned sample 102 may be formed of at least a first material, a second material, a third material . . . up to an Nth number of materials.

In embodiments, the first material or the second material may include, but is not required to include, porous carbon doped organosilicon (pSiCOH), copper (Cu), cobalt (Co), ruthenium (Ru), tungsten (W), aluminum (Al), silicon (Si), polycrystalline silicon, titanium nitride (TiN), silicon nitride ($Si_3N_4$), and the like.

Referring to FIG. 2B, the sample 102 may include a defect 204 positioned between a portion of the first material 200 and a portion of the second material 202. For example, the sample 102 may include a bridge defect positioned between a portion of the first material 200 and a portion of the second material 202. For instance, the bridge defect may be a 10 nm bridge defect, where the critical dimension of the line and space array is 10 nm.

Referring to FIG. 2B, in embodiments, the sample 102 includes a plurality of photoluminescent markers 206 configured to selectively bind to one of the first material 200 or the second material 202 to enhance a feature of interest on the sample 102. For example, the plurality of photoluminescent markers 206 may be configured to preferentially attach to a targeted material (e.g., the first material 200 or the second material 202) to enable the targeted material to have enhanced photon emission based on the properties of the photoluminescent marker 206. In one instance, the plurality of photoluminescent markers 206 may be configured to preferentially attach to the first material 200 and not the second material 202, such that only the signal from the first material 200 is enhanced. In another instance, the plurality of photoluminescent markers 206 may be configured to preferentially attach to the second material 202 and not the first material 200, such that only the signal from the second material 202 is enhanced.

For purposes of the present disclosure, it is noted that a feature of interest may include, but is not limited to, a defect of interest, a pattern of interest, or a material of interest. For example, the plurality of photoluminescent markers 206 may be configured to selectively bind to one of the first material 200 or the second material 202 to enhance a defect of interest. By way of another example, the plurality of photoluminescent markers 206 may be configured to selectively bind to one of the first material 200 or the second material 202 to enhance a pattern of interest. By way of another example, the plurality of photoluminescent markers 206 may be configured to selectively bind to one of the first material 200 or the second material 202 to enhance a material of interest.

The plurality of photoluminescent markers 206 may include one or more photoluminescent molecules including, but not limited to, one or more organic dyes, one or more quantum dots, one or more carbon dots, one or more transition metals, one or more conjugated polymers, one or more phosphorescent nanoparticles, and the like.

The plurality of photoluminescent markers (or photoluminescent molecules) in an inspection sub-system 101 may include any type of photoluminescent particle suitable for generating photoluminescence. For example, the one or more photoluminescent tags may include one or more fluorescent tags. For instance, the signal molecule may include one or more hydrophobic fluorophores, one or more hydrophilic fluorophores, and the like. It is noted that the description of fluorescence in the present disclosure is intended to be illustrative rather than limiting and that detection of defects using any type of photoluminescent material is within the scope of the present disclosure.

Photoluminescent markers are generally discussed in U.S. Non-Provisional patent application Ser. No. 17/887,078, entitled SYSTEM AND METHOD FOR FEATURE SIGNAL ENHANCEMENT USING SELECTIVELY BOUNDED PHOTOLUMINESCENT Material, filed on Aug. 12, 2022; and U.S. Non-Provisional patent application Ser. No. 18/101,573, filed on Jan. 25, 2023, which are both incorporated by reference in their entirety.

Referring again to FIG. 1C, in embodiments, each inspection sub-system 101 includes a set of optical element elements 116 configured to direct the one or more illumination beams 114 to the sample 102.

In embodiments, the set of optical elements 116 of the respective inspection sub-systems 101a-101d are configured to cause the plurality of photoluminescent markers 206 to selectively emit photoluminescent illumination at a predetermined time interval within a point spread function (PSF). For example, the set of optical elements of the array of inspection sub-systems 101a-101d may be configured to independently and selectively direct the one or more illumination beams 114 to the plurality of photoluminescent markers 206 of the sample 102 at a plurality of time intervals ($t_1, t_2 \ldots t_n$) to cause the plurality of photoluminescent markers 206 to selectively emit photoluminescent emission. For instance, a respective inspection sub-system 101a-101a may be configured to selectively cause a subset of the plurality of photoluminescent markers 206 to emit light at a specified time within a point spread function (PSF).

Figure 2C:
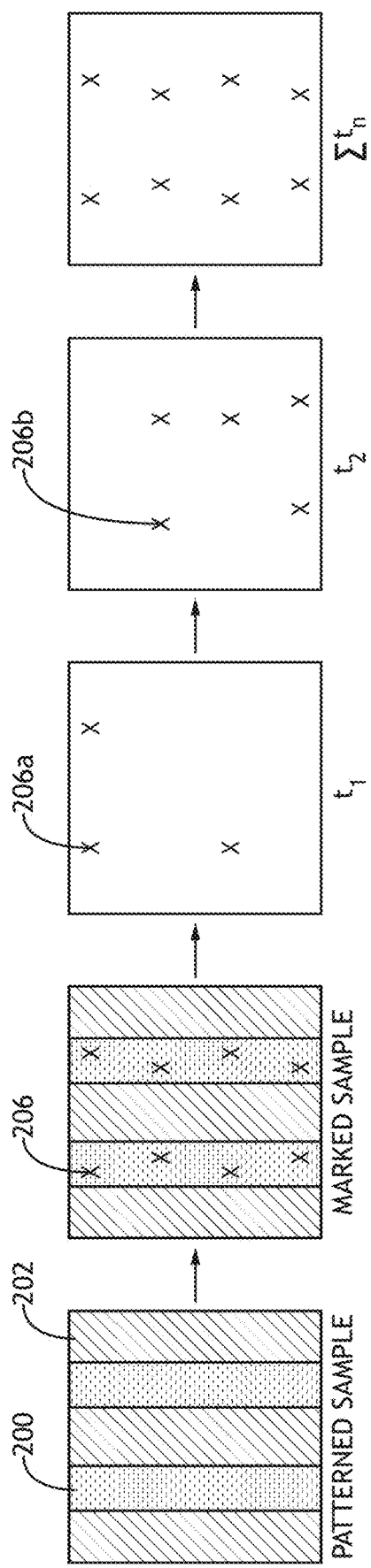
FIG. 2C illustrates a simplified schematic of a method of determining a position of the plurality of photoluminescent markers on the sample, in accordance with one or more embodiments of the present disclosure.

In this regard, as shown in FIG. 2C, at a first time interval $t_1$, a first subset of photoluminescent markers 206a may be configured to emit light. Further, as shown in FIG. 2C, a second time interval $t_2$, a second subset of photoluminescent markers 206b may be configured to emit light. As will be discussed further herein, a summation of the subsets of photoluminescent markers over the respective time interval ($t_n$) may be used to achieve super resolution. For example, super resolution may be achieved by selectively controlling the plurality of photoluminescent markers at the plurality of time intervals.

In embodiments, each inspection sub-system 101 includes one or more collection optics 118 configured to collect photoluminescent emission 120 emitted from the sample 102 and direct the photoluminescent emission 120 to one or more detectors 122. It is noted herein that one or more collection optics 118 may be oriented in any position relative to the sample 102.

In embodiments, each inspection sub-system 101 includes one or more optical elements 124 configured to condition the photoluminescent emission 120 prior to detection by the one or more detectors 122.

It is noted herein that the set of one or more optical elements 116, the one or more collection optics 118, and the one or more optical elements 124 may be referred to as a single set of optical elements. It is further noted that the set of one or more optical elements 116, the one or more collection optics 118, the one or more optical elements 124 may share common optical elements. For example, a single objective lens may be configured to both direct illumination to the sample and collect returned light from the sample.

Further it is noted that the set of optical elements 116, 118, 124 may include any type of optical element. For example, the set of optical elements may include, but are not limited to, one or more diffractive optical elements (DOEs), one or more lenses, one or more mirrors, or the like. In one instance, where the set of optical elements include one or more lenses, the one or more lenses may include one or more micro-lenses (or miniature lenses). In another instance, where set of optical elements include one or more mirrors, the one or more mirrors may include one or more microelectromechanical (MEM) systems.

Micro-mirror arrays (MMAs) are generally discussed in U.S. Pat. No. 9,104,120, entitled Structured Illumination for Contrast Enhancement in Overlay Metrology, issued on Aug. 11, 2015, which is incorporated by reference in the entirety. Micro-lenses are generally discussed in U.S. Pat. No. 7,180,658, entitled High Performance Catadioptric Imaging System, issued on Feb. 20, 2007; U.S. Pat. No. 7,639,419, entitled Inspection System using Small Catadioptric Objective, issued on Dec. 29, 2009; U.S. Pat. No. 7,646,533, entitled Small Ultra-High Catadioptric Objective, issued on Jan. 12, 2010; U.S. Pat. No. 7,869,121, entitled Small Ultra-High NA Catadioptric Objective Using Aspheric Surfaces, issued on Jan. 11, 2011, all of which are incorporated by reference in the entirety.

Further, it is noted herein that the one or more detectors 122 may include any optical detector known in the art suitable for measuring light emerging from the sample 102. For example, the one or more detectors 122 may include, but is not limited to, a charged-coupled device (CCD) detector, a complementary metal-oxide-semiconductor (CMOS) detector, an electron-multiplying CCD detector, electron multiplying CCD (EMCCD), and the like.

In embodiments, each inspection sub-system 101a-101d may include a controller communicatively coupled to the one or more detectors 122. The controller may include one or more processors configured to execute a set of program instructions maintained in a memory medium (memory).

In embodiments, the controller may be communicatively coupled to the stage assembly 104 to associate photoluminescent emission 120 from the plurality of photoluminescent markers with specific locations on the sample 102 associated with one or more defects. For example, the one or more processors of the controller may be configured to adjust a position of the stage assembly 104 at a plurality of time intervals to generate a plurality of optical images 105a-105d of the sample 102 at the respective time intervals. For instance, the one or more processors may be configured to adjust a position of the stage assembly 104 such that a respective inspection sub-system 101a-101d may be configured to image a respective portion of the sample 102 when a respective photoluminescent marker is emitting light (e.g., when the marker is "on"), as will be discussed further herein. For purposes of the present disclosure, the term "active markers", and variations thereof include photoluminescent markers that are emitting light (e.g., are illuminated by the one or more illumination beams 114) at the specified time.

Figure 3:
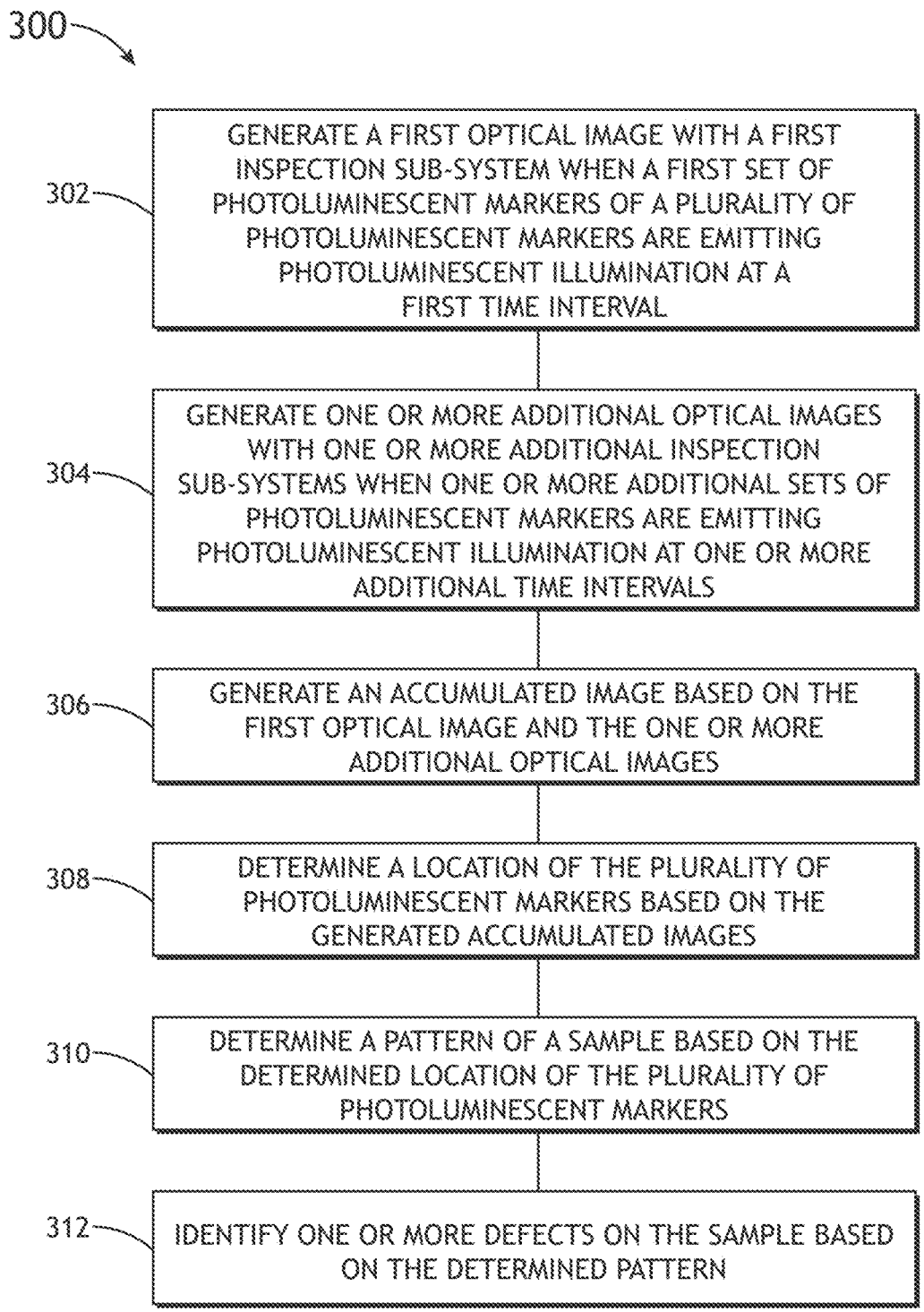
FIG. 3 illustrates a flow diagram depicting a method to detect one or more defects using the photoluminescent material, in accordance with one or more embodiments of the present disclosure.
Figure 4A:
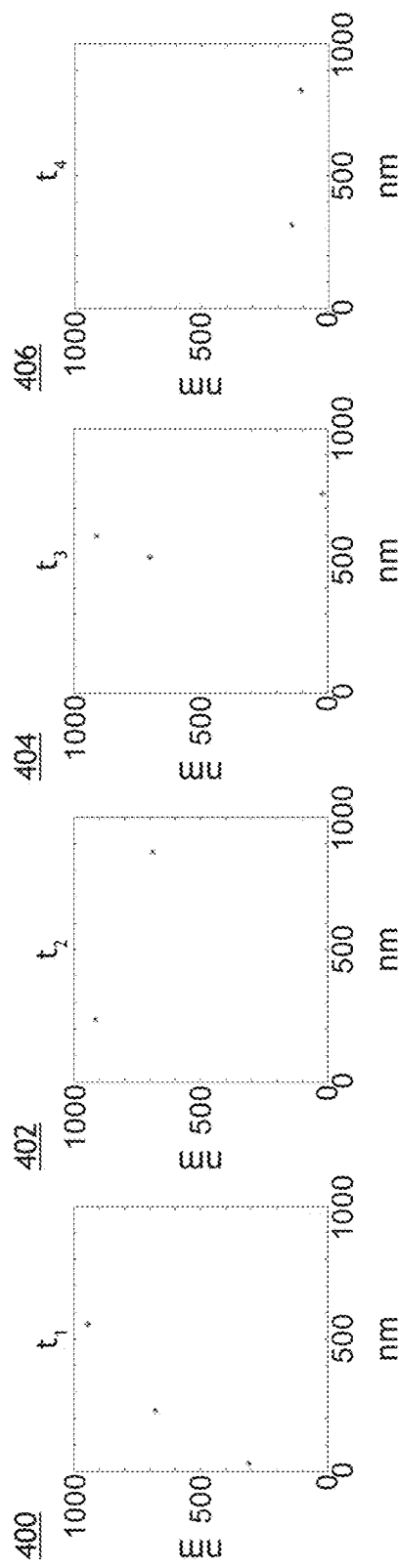
FIG. 4A illustrates active markers on the sample at a plurality of time intervals, in accordance with one or more embodiments of the present disclosure.
Figure 4B:
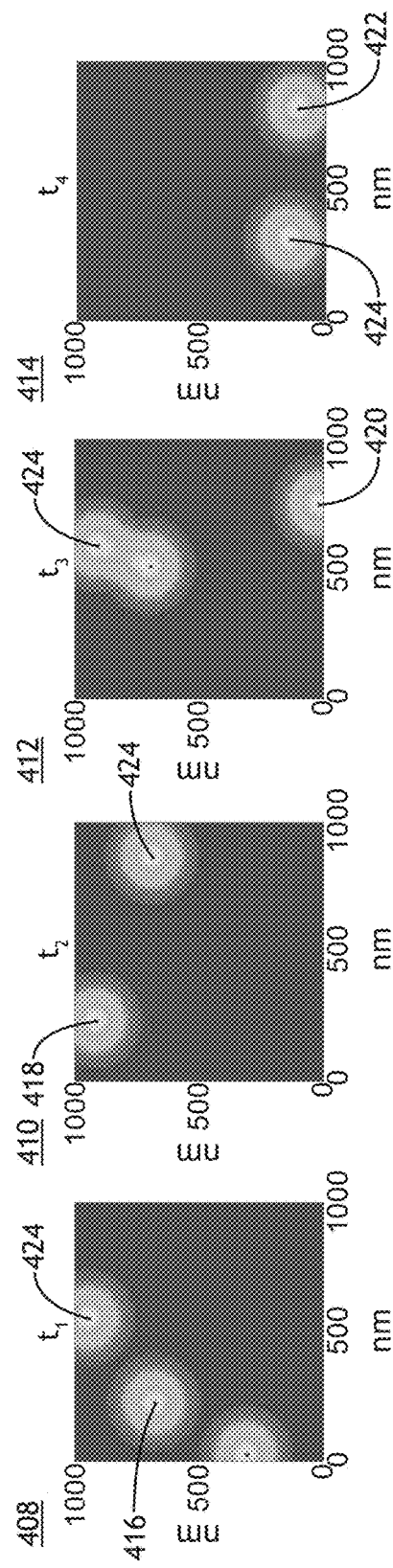
FIG. 4B illustrates a plurality of optical images generated at each of the plurality of time intervals along with the corresponding peak position of the point spread function, in accordance with one or more embodiments of the present disclosure.

FIG. 3 illustrates a flow diagram depicting a method 300 to detect defects using photoluminescent materials selectively attached to a target material of the sample, in accordance with one or more embodiments of the present disclosure. FIG. 4A illustrates active markers on the sample 102 at a plurality of time intervals, in accordance with one or more embodiments of the present disclosure. FIG. 4B illustrates a plurality of optical images generated at each of the plurality of time intervals along with the corresponding peak position of the point spread function, in accordance with one or more embodiments of the present disclosure.

In a step 302, a first optical image may be generated. For example, a first inspection sub-system 101a may generate a first optical image when a first subset of photoluminescent markers are emitting photoluminescent. For instance, a first set of illumination sources of the first inspection sub-system 101a may be configured to generate the first set of illumination beams 114 at $t_1$ and a first set of optical elements may be configured to independently and selectively direct the first set of illumination beams 114 to the first set of photoluminescent markers of the sample 102. Further, a first set of detectors 122 of the first inspection sub-system 101a may be configured to detect the photoluminescent illumination 120 from the first subset of photoluminescent markers 206 at $t_1$ to generate the first optical image may be generated based on the emitted photoluminescent light.

Referring to FIG. 4A, at a first time interval $t_1$, a first subset of photoluminescent markers 206a may be configured to emit light.

Referring to FIG. 4B, a first optical image 408 may be generated by the first inspection sub-system 101a at the first time interval ($t_1$) when the first subset of active markers 400 are emitting light.

In a step 304, one or more additional optical images may be generated. For example, one or more additional inspection sub-systems 101b-101d may generate one or more additional optical images when one or more additional subsets of photoluminescent markers are emitting photoluminescent. For instance, one or more additional subsets of illumination sources of the one or more additional inspection sub-systems 101b-101d may be configured to generate one or more additional subsets of illumination beams 114 at the one or more additional time intervals $t_2$-$t_n$ and one or more additional subsets of optical elements may be configured to independently and selectively direct the one or more additional illumination beams 114 to the one or more additional subsets of photoluminescent markers of the sample 102. Further, one or more additional subsets of detectors 122 of the one or more additional inspection sub-systems 101b-101d may be configured to detect the photoluminescent emission 120 from the one or more additional subsets of photoluminescent markers 206 at the one or more additional time intervals $t_2$-$t_n$ to generate the one or more additional optical image based on the emitted photoluminescent light.

Referring to FIG. 4A, a second subset of markers 402 may be configured to emit light at a second time interval ($t_2$), a third subset of markers 404 may be configured to emit light at a third time interval ($t_3$), and a fourth subset of markers 406 may be configured to emit light at a fourth time interval ($t_4$).

Referring to FIG. 4B, in a non-limiting example, a second optical image 410 may be generated by a second inspection sub-system 101b at a second time interval ($t_2$) when the second subset of active markers 402 are emitting light. By way of another example, as shown in FIG. 4B, a third optical image 412 may be generated by a third inspection sub-system 101c at a third time interval ($t_3$) when the third subset of active markers 404 are emitting light. By way of another example, as shown in FIG. 4B, a fourth optical image 414 may be generated by a fourth inspection sub-system 101d at a fourth time interval ($t_4$) when the fourth subset of active markers 406 are emitting light.

In embodiments, the plurality of optical images 408-414 are configured to identify the corresponding peak positions of the PSF of the active markers 400-406. For example, a first set of peak positions 416 of the PSF of the first subset of active markers 400 are identified in the first optical image 408 taken at $t_1$. By way of another example, a second set of peak positions 418 of the PSF of the second subset of active markers 402 are identified in the second optical image 410 taken at $t_2$. By way of another example, a third set of peak positions 420 of the PSF of the third subset of active markers 404 are identified in the third optical image 412 taken at $t_3$. By way of another example, a fourth set of peak positions 422 of the PSF of the fourth subset of active markers 406 are identified in the fourth optical image 414 taken at $t_4$. It is noted that the density of the subset of photoluminescent markers may be controlled such that the peaks of PSF give the precise markers. Further, through time, the positions of all markers may be determined, such that the cumulative marker location map leads to a super resolution image.

Although FIGS. 4A-4B illustrate a specific configuration of active markers, it is noted that the system 100 may include any number of markers and be configured to activate any configuration of markers at any number of time intervals. FIGS. 4A-4B are provided merely for illustrative purposes and shall not be construed as limiting the scope of the present disclosure.

In a step 306, an accumulated position maps may be generated based on the first optical image and the one or more additional optical images. For example, the controller 106 may be configured to generate a plurality of accumulated position maps at a plurality of time stamps to determine a pattern of the sample 102.

Figure 5:
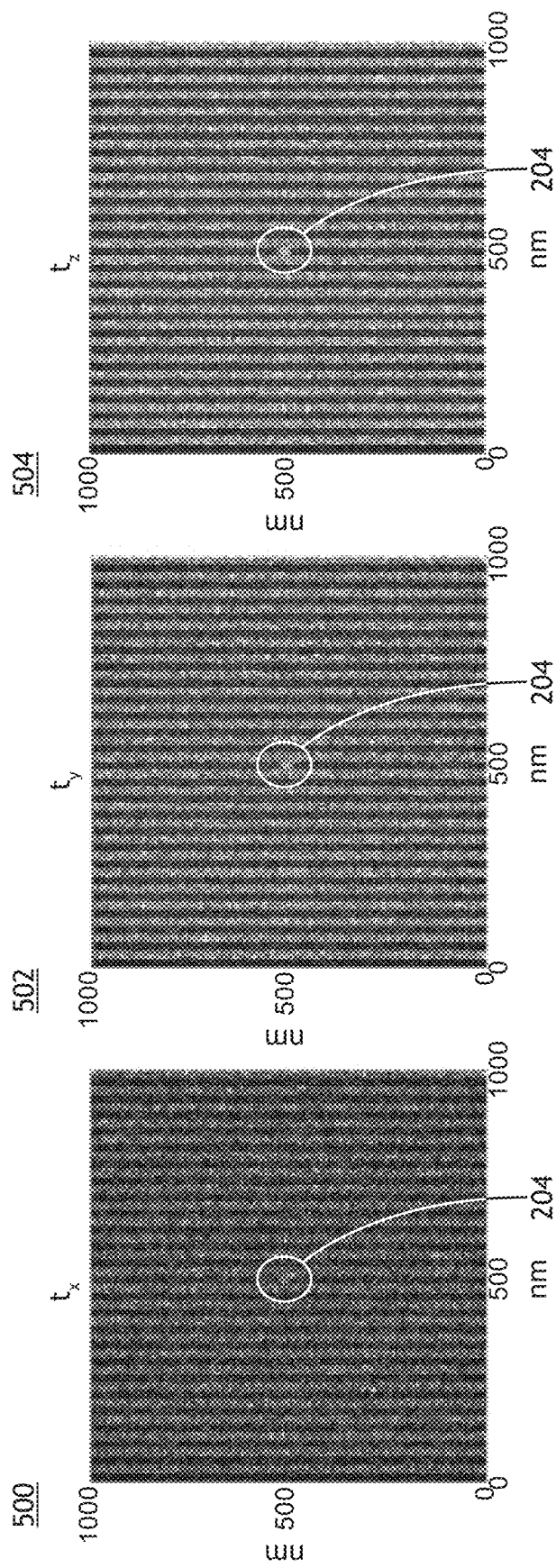
FIG. 5 illustrates accumulated position maps at a plurality of time intervals, in accordance with one or more embodiments of the present disclosure.

Referring to FIG. 5, a first position map 500 at a first time stamp ($t_x$) may be generated, a second position map 502 at second time stamp ($t_y$) may be generated, and a third position map 504 at a third time stamp ($t_z$) may be generated. As shown in FIG. 5, the position map 500 generated through time, a $t_x$, fractional marker locations may be determined. In comparison, after the third time stamp ($t_z$) the pattern of the sample is more clearly visible, such that the bridge defect 204 is visually discernable from the pattern of the sample 102.

In a step 308, a location of the plurality of photoluminescent markers is determined based on the generated accumulated position map. For example, as previously discussed herein, because the active markers are well separated, the controller 106 may be configured to determine a location of the markers based on the PSF peaks (such as the PSF peaks 416-422 shown in FIG. 4B) of the plurality of optical images (such as the images 406-414 shown in FIG. 4B). For instance, the estimated marker location may be determined based on the PSF peak of each optical image.

In a step 310, a pattern of the sample is determined based on an accumulated position map of the plurality of position maps. For example, the controller 106 may be configured to determine a pattern of the sample based on an accumulated position map. For instance, after a predetermined time step, the pattern of the sample 102 may be discernible.

In a step 312, a defect on the sample is detected based on the determined pattern of the sample. For example, the controller 106 may be configured to determine a location of a defect on the sample based on the determined pattern of the sample. For instance, after the predetermined time step, the defect may be visually discernable from the pattern of the sample 102.

Although embodiments of the present disclosure are directed to an inspection system, it is contemplated that the patterned wafer including the selectively bounded photoluminescent material may be used with any characterization system including, but not limited to, an optical metrology system (e.g., image-based metrology system), or the like.

It is further contemplated that each of the embodiments of the method described above may include any other step(s) of any other method(s) described herein. In addition, each of the embodiments of the method described above may be performed by any of the systems described herein.

Referring again to FIG. 1, the one or more processors 108 of the controller 106 may include any processing element known in the art. In this sense, the one or more processors 108 may include any microprocessor-type device configured to execute algorithms and/or instructions. In one embodiment, the one or more processors 108 may consist of a desktop computer, mainframe computer system, workstation, image computer, parallel processor, or any other computer system (e.g., networked computer) configured to execute a program configured to operate the system 100, as described throughout the present disclosure. It is further recognized that the term "processor" may be broadly defined to encompass any device having one or more processing elements, which execute program instructions from a non-transitory memory medium 110. Therefore, the above description should not be interpreted as a limitation on the present invention but merely an illustration.

The memory medium 110 may include any storage medium known in the art suitable for storing program instructions executable by the associated one or more processors 108. By way of a non-limiting example, the memory medium 110 may include a non-transitory memory medium. By way of additional non-limiting examples, the memory medium 110 may include, but is not limited to, a read-only memory, a random access memory, a magnetic or optical memory device (e.g., disk), a magnetic tape, a solid state drive, and the like. It is further noted that memory 110 may be housed in a common controller housing with the one or more processors 108. In an alternative embodiment, the memory 110 may be located remotely with respect to the physical location of the one or more processors 108 and controller 106. For instance, the one or more processors 108 of the controller 106 may access a remote memory (e.g., server), accessible through a network (e.g., internet, intranet, and the like).

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A multi-element super resolution inspection system comprising:
   an array of inspection sub-systems, each inspection sub-system comprising:
      one or more illumination sources configured to illuminate a sample positioned on a stage with one or more illumination beams, the sample including at least a first material and at least a second material, wherein the first material is different from the second material, the sample including a plurality of photoluminescent markers configured to selectively bind to one of the first material or the second material to enhance a feature of interest on the sample;
      a set of optical elements, at least one optical element of the set of optical elements configured to independently and selectively direct the one or more illumination beams from the one or more illumination sources to the plurality photoluminescent markers of the sample to cause at least one photoluminescent marker of the plurality of photoluminescent markers to emit photoluminescent illumination; and
      one or more detectors configured to detect the photoluminescent illumination emitted by the at least one photoluminescent marker of the plurality of photoluminescent markers selectively bound to one of the first material or the second material of the sample, the set of optical elements configured to selectively direct the photoluminescent illumination from the at least one photoluminescent marker of the plurality of photoluminescent markers of one of the first material or the second material of the sample to the one or more detectors,
   wherein a first inspection sub-system of the array of inspection sub-systems is configured to generate a first illumination beam at a first time interval and direct the first illumination beam to a first portion of the sample including a first set of photoluminescent markers to cause the first set of photoluminescent markers to emit photoluminescent illumination at the first time interval, the first inspection sub-system of the array of inspection sub-systems configured to image the first portion of the sample at the first time interval when the first set of photoluminescent markers are emitting photoluminescent illumination to generate a first optical image,
   wherein one or more additional inspection sub-systems of the array of inspection sub-systems are configured to generate an additional set of illumination beams at one or more additional time intervals and direct the additional sets of illumination beams to one or more additional portions of the sample including one or more additional sets of photoluminescent markers to cause the one or more additional sets of photoluminescent markers to emit photoluminescent illumination at the one or more additional time intervals, the one or more additional inspection sub-systems of the array of inspection sub-systems configured to image the one or more additional portions of the sample at the one or more additional time intervals when the one or more additional sets of photoluminescent markers are emitting photoluminescent illumination to generate one or more additional optical images; and
   a controller communicatively coupled to the array of inspection sub-systems, wherein the controller includes one or more processors configured to execute program instructions:
      receive the first optical image from the first inspection sub-system;
      receive the one or more additional optical images from the one or more additional inspection sub-systems;
      generate an accumulated optical image based on the received first optical image and the one or more additional received optical images;
      determine a location of the plurality of photoluminescent markers based on the accumulated optical image; and
      determine a pattern of the sample based on the determined location of the plurality of photoluminescent markers.

2. The system of claim 1, wherein the one or more processors are configured to execute program instructions to cause the one or more processors to:
   identify one or more defects of the sample based on the determined pattern of the sample.

3. The system of claim 1, wherein the generated plurality of optical images include a point spread function of one or more active photoluminescent markers of the plurality of photoluminescent markers, wherein the one or more active plurality of photoluminescent markers include one or more photoluminescent markers emitting photoluminescent light.

4. The system of claim 1, wherein the set of optical elements comprise at least one diffractive optical element.

5. The system of claim 1, wherein the set of optical elements comprise at least one lens.

6. The system of claim 1, wherein the set of optical elements comprise at least one mirror.

7. The system of claim 1, wherein the one or more illumination sources are configured to excite the plurality of photoluminescent markers of one of the first material or the second material of the sample.

8. The system of claim 1, wherein the plurality of photoluminescent markers include at least one of:
   one or more organic dyes, one or more fluorophores, one or more quantum dots, one or more carbon dots, one or more transition metals, one or more conjugated polymers, or one or more phosphorescent nanoparticles.

9. The system of claim 1, wherein one of the first material or the second material includes at least one of:
   porous carbon doped organosilicon, copper, cobalt, ruthenium, tungsten, aluminum, silicon, polycrystalline silicon, titanium nitride, or silicon nitride.

10. The system of claim 1, wherein the sample comprises a substrate.

11. The system of claim 10, wherein the substrate comprises a wafer.

12. A method for super resolution inspection, the method comprising:
generating a first optical image of a sample with a first inspection sub-system of an array of inspection sub-systems, the sample including at least a first material and at least a second material, wherein the first material is different from the second material, wherein the sample includes a plurality of photoluminescent markers configured to selectively bind to one of the first material or the second material to enhance a feature of interest on the sample, the first optical image generated when a first set of photoluminescent markers of the plurality of photoluminescent markers are emitting photoluminescent illumination at a first time interval;
generating one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals;
generating an accumulated optical image based on the received first optical image and the one or more additional received optical images;
determining a location of the plurality of photoluminescent markers based on the accumulated optical image; and
determining a pattern of the sample based on the determined location of the plurality of photoluminescent markers.

13. The method of claim 12, wherein the generating a first optical image with a first inspection sub-system of an array of inspection sub-systems, the first optical image generated when a first set of photoluminescent markers of a plurality of photoluminescent markers are emitting photoluminescent illumination at a first time interval comprises:
generating a first illumination beam using a first illumination source of a first inspection sub-system at a first time interval;
selectively directing the first illumination beam to the sample using a first set of optical elements at the first time interval; and
detecting a first photoluminescent illumination beam emitted preferentially from the first set of photoluminescent markers selectively bound to one of the first material or the second material of the sample using a first detector at the first time interval.

14. The method of claim 12, wherein the generating one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals comprises:
generating one or more additional sets of illumination beams using one or more additional sets of illumination sources of one or more additional inspection sub-systems at one or more additional time intervals;
selectively directing the one or more additional sets of illumination beams to the sample using one or more additional sets of optical elements at the one or more additional time intervals; and
detecting one or more additional sets of photoluminescent illumination beams emitted preferentially from one or more additional sets of photoluminescent markers selectively bound to one of the first material or the second material of the sample using one or more additional sets of detectors at the one or more additional time intervals.

15. The method of claim 12, further comprising:
identifying one or more defects of the sample based on the determined pattern of the sample.

16. The method of claim 12, wherein the set of optical elements comprise at least one mirror.

17. The method of claim 12, wherein one of the generated first optical image or the generated one or more additional optical images include a point spread function of one or more active photoluminescent markers of the plurality of photoluminescent markers, wherein the one or more active photoluminescent markers include one or more photoluminescent markers emitting photoluminescent illumination.

18. The method of claim 12, wherein the plurality of photoluminescent markers include at least one of:
one or more organic dyes, one or more quantum dots, one or more carbon dots, one or more transition metals, or one or more conjugated polymers.

19. The method of claim 12, wherein one of the first material or the second material includes at least one of:
porous carbon doped organosilicon, copper, cobalt, ruthenium, tungsten, aluminum, silicon, polycrystalline silicon, titanium nitride, or silicon nitride.

20. A system comprising:
a controller including one or more processors configured to execute program instructions to cause the one or more processors to:
generate a first optical image of a sample with a first inspection sub-system of an array of inspection sub-systems, the sample including at least a first material and at least a second material, wherein the first material is different from the second material, the sample including a plurality of photoluminescent markers configured to selectively bind to one of the first material or the second material to enhance a feature of interest on the sample, the first optical image generated when a first set of photoluminescent markers of the plurality of photoluminescent markers are emitting photoluminescent illumination at a first time interval;
generate one or more additional optical images with one or more additional inspection sub-systems of the array of inspection sub-systems, the one or more additional optical images generated when one or more additional sets of photoluminescent markers of the plurality of photoluminescent markers are emitting photoluminescent illumination at one or more additional time intervals;
generate an accumulated optical image based on the received first optical image and the one or more additional optical images;
determine a location of the plurality of photoluminescent markers based on the accumulated optical image; and
determine a pattern of the sample based on the determined location of the plurality of photoluminescent markers.

21. The system of claim 20, wherein the one or more processors are further configured to execute program instructions to cause the one or more processors to:
  identifying one or more defects of the sample based on the determined pattern of the sample.

\* \* \* \* \*